(12) United States Patent
Arneth et al.

(10) Patent No.: US 7,850,560 B2
(45) Date of Patent: Dec. 14, 2010

(54) DOUBLE ECCENTRIC TENSIONING DEVICE

(75) Inventors: Roland Arneth, Eggolsheim (DE); Niels Flamig, Hessdorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 271 days.

(21) Appl. No.: 11/828,427

(22) Filed: Jul. 26, 2007

(65) Prior Publication Data

US 2008/0153644 A1 Jun. 26, 2008

(30) Foreign Application Priority Data

Dec. 21, 2006 (DE) .................. 10 2006 061 803

(51) Int. Cl.
*F16H 7/12* (2006.01)
(52) U.S. Cl. .................. 474/112; 474/117; 474/135
(58) Field of Classification Search .............. 474/101, 474/111, 133–13, 109, 112, 115, 117
See application file for complete search history.

(56) References Cited

U.S. PATENT DOCUMENTS

| 4,516,962 | A | * | 5/1985 | Brandenstein et al. | ...... | 474/112 |
| 5,919,107 | A | * | 7/1999 | Stepniak | ...... | 474/112 |
| 2005/0181902 | A1* | | 8/2005 | Konanz | ...... | 474/135 |
| 2008/0113835 | A1* | | 5/2008 | Baumuller et al. | ...... | 474/112 |

FOREIGN PATENT DOCUMENTS

DE 4033777 4/1992

* cited by examiner

*Primary Examiner*—Robert A Siconolfi
*Assistant Examiner*—Anna Momper
(74) *Attorney, Agent, or Firm*—Volpe and Koenig, P.C.

(57) ABSTRACT

A tensioning device constructed, in particular, as a double eccentric tensioning device for a traction means drive is provided, which guarantees in the installed state a sufficient pretensioning of a traction means of the traction means drive. The invention provides advantages in the installation of the eccentric tensioning devices under assembly-specific aspects. This is provided by an eccentric tensioning device for a traction means drive, with a track roller device, which includes a running disk and a rolling bearing provided for supporting the disk. An operating eccentric for supporting the track roller device such that it can be displaced in a radial direction relative to the rotating axis of the rolling bearing according to a magnitude of the pivoting of the operating eccentric, and a torsion spring for pretensioning the operating eccentric in a pivoting direction are provided. The operating eccentric forces the track roller device carried by the eccentric against an allocated traction means. An adjustment eccentric for radial displacement of the operating eccentric is provided, and a fixing device for securing the operating eccentric in a mounting position, in which the torsion spring is held via a shearing structure. In this way, it is possible in an advantageous way to set the tensioning device as a pretensioned unit on the flange surface and to trigger activation of the tensioning device within the scope of the mounting measures caused with the attachment of the tensioning device.

11 Claims, 4 Drawing Sheets

DOUBLE ECCENTRIC TENSIONING DEVICE

BACKGROUND

The present invention relates to a tensioning device constructed especially as a double eccentric tensioning device for a traction means drive, which, in the installed state, guarantees sufficient pretensioning of a traction means of the traction means drive.

From DE 40 33 777 A1 a tensioning device constructed as a double eccentric tensioning device is known. This tensioning device comprises an adjustment eccentric, which is provided for receiving an attachment screw with an eccentrically positioned bore. By means of the attachment screw, the tensioning device is mounted on a housing, especially a housing of the internal combustion engine. A work or operating eccentric surrounding the adjustment eccentric is supported so that it can pivot by means of a plain or slide bearing on the adjustment eccentric. A rolling bearing comprising a rolling bearing outer ring, which is constructed so that this simultaneously provides the function of a running disk, by means of which the tensioning device is supported against a traction means, especially a belt, in the operating state. For achieving a firm contact of the running means on the traction means, between the base plate and the operating eccentric there is a torsion spring, whereby a pivoting moment is applied to the operating eccentric and in this way the running disk is forced against the traction means, especially a toothed belt. For mounting the traction means, this known tensioning device requires manual rotation of the operating eccentric into an end position, because a placement of the traction means is possible only in this way.

SUMMARY

The invention is based on the objective of creating solutions, through which advantages are given in the installation of the eccentric tensioning devices, as well as, in particular in terms of the placement of a traction means on the associated driving disks under mounting-specific aspects.

This objective is achieved according to the invention by an eccentric tensioning device for a traction means drive, with:
- a track roller device, which as such comprises a running disk and a rolling bearing provided for supporting the disk;
- an operating eccentric for supporting the track roller device such that this can be displaced in a radial direction relative to the rotating axis of the rolling bearing according to a magnitude of the pivoting of the operating eccentric,
- a torsion spring for pretensioning the operating eccentric in a pivoting direction, in which the operating eccentric forces the track roller device carried by this eccentric against an associated traction means,
- an adjustment eccentric for radial displacement of the operating eccentric,
- a fixing device for securing the operating eccentric in a mounting position, in which the torsion spring is located in a pretensioned state,
- wherein the fixing device is constructed as a shearing structure.

Therefore, it becomes possible in an advantageous way to set the tensioning device on the flange surface as a pretensioned unit and to trigger an activation of the tensioning device within the scope of the mounting measures performed with the attachment of the tensioning device.

To meet the above-noted objective, the invention provides for fixing both the adjustment eccentric and also the operating eccentric in an assembled position, in order to allow, on one hand, simple traction means assembly and in order to be able to realize, on the other hand, a maximum adjustment range of the tensioning device in the operating state of the internal combustion engine.

For supporting an aligned installation of the adjustment eccentric, preferably a friction disk, which is used as an axial bearing and which simultaneously encloses a pin that engages with a positive fit in a receptacle of the adjustment eccentric or the operating eccentric, is arranged between the operating eccentric and the adjustment eccentric. This pin is preferably constructed as a shear pin.

The pin constructed as a shear pin is here preferably allocated to a pocket bore, in which the shear pin remains and is secured captively after the completion of the adjustment.

To improve the effectiveness of this securing by means of a shear pin, the friction disk can also be provided on the inner periphery with another radially inwardly directed shear pin, which engages in an end groove of the carrier body, on which the adjustment eccentric is supported rotatably by means of a slide bearing.

The dimensioning and arrangement of the shear pin or the shear pins is preferably realized so that, on one hand, sufficient securing against independent rotation is given and, on the other hand, for the mounting in the operating step of the work point adjustment of the tensioning device, the pin or the pins are sheared off after overcoming a moderate adjustment force.

The concept according to the invention leads to significant simplification in the mounting of the tensioning device. The tensioning device allows the compensation of
- diameter and positional tolerances of the individual disks of the traction means drive;
- length tolerances of the traction means, especially toothed belt;
- belt wear;
- temperature differences;
- and effects based on the dynamic behavior of the internal combustion engine.

BRIEF DESCRIPTION OF THE DRAWINGS

Additional details and features of the invention emerge from the following description in connection with the drawing. Shown are.

DETAILED DESCRIPTION OF THE PREFERRED EMBODIMENTS

Figure 1:
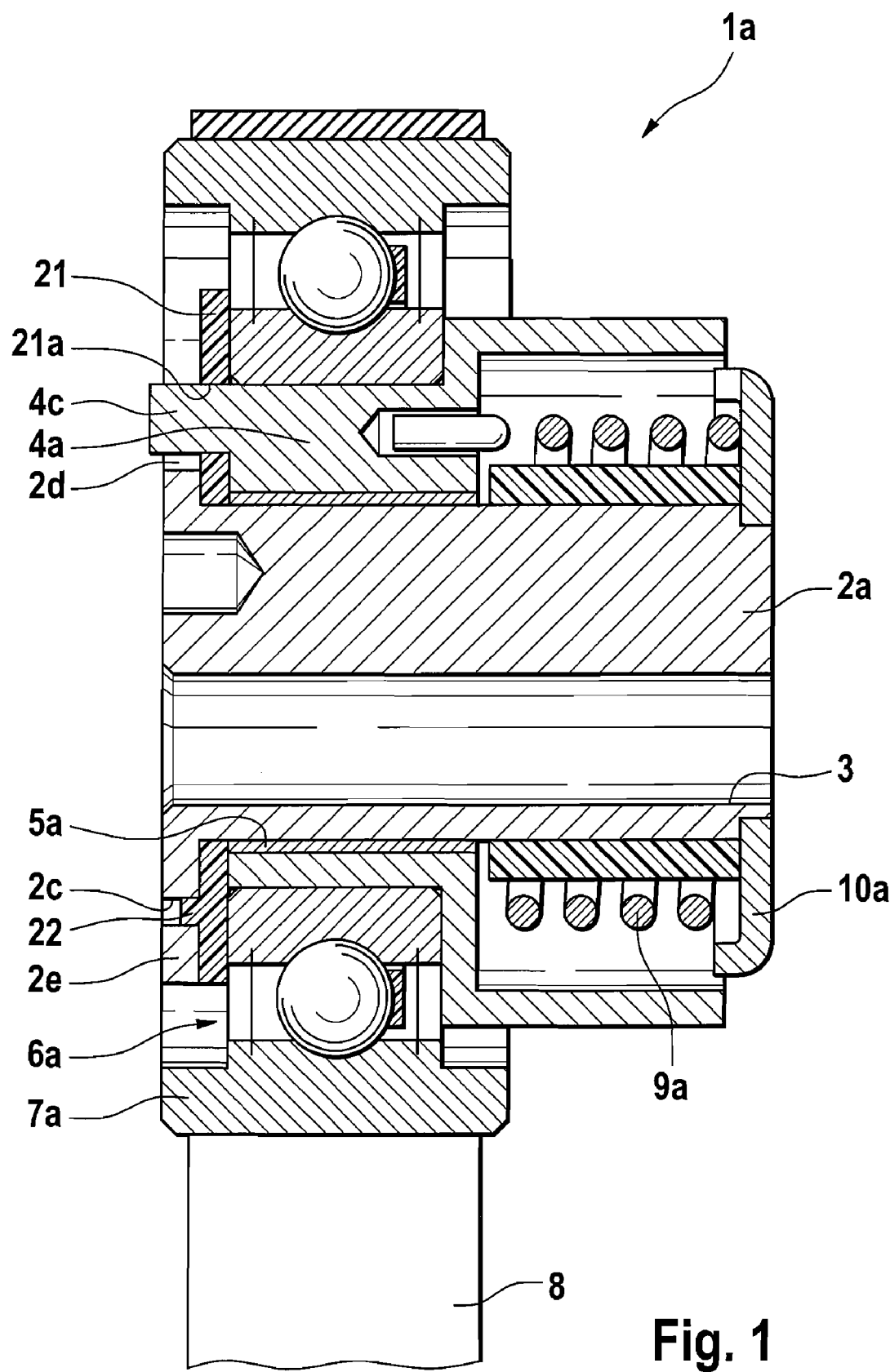
FIG. 1 an axial section view for illustrating the construction of a double eccentric tensioning device according to the invention.

FIG. 1 shows in a half-section a tensioning device 1*a* with an adjustment eccentric 2*a*, which is clamped onto a flange surface in the operating state by means of a separate attachment screw that is not shown in more detail in FIG. 1 and inserted into an eccentric receptacle bore 3 and which is fixed in this way to the structure providing the flange surface. An operating eccentric 4*a* surrounding the adjustment eccentric 2*a* is rotatably arranged on the adjustment eccentric 2*a* by means of a plain or slide bearing 6*a*. On the outside, in some regions the operating eccentric 4*a* is surrounded by a rolling bearing 6*a*, whose outer ring simultaneously takes on the function of a running disk 7*a*, by means of which the tensioning device 1*a* is pressed against a traction means 8 in the operating state. A torsion spring 9*a*, which is inserted between a plate 10*a* allocated on one end to the adjustment eccentric 2*a* and the operating eccentric 4*a*, is used for achieving a firm contact of the running disk 7*a* against the traction means 8.

The tensioning device 1*a* is provided with a friction disk 21, through which a friction moment is generated, which brakes the pivoting movement of the operating eccentric 4*a* relative to a base flange section 2*b* of the adjustment eccentric 2*a*. In the base flange section 2*b* there is a catch structure constructed as bore 2*c*. In this bore 2*c* there is a shearing structure constructed as pin 22. This shearing structure at the beginning forms an integral component of the friction disk 21. The shearing structure is constructed so that this has a transverse force transmission capability that is sufficient for securing the tensioning device in a pretensioned state. This shearing structure is sheared off when a sufficiently high torsion moment active between the adjustment eccentric 2*a* and the operating eccentric 4*a* is exceeded. The pin 22 projecting into the bore 2*c* and separated from the friction disk 21 after the shearing process is performed can remain in the bore 2*c*.

The torque transmission necessary for temporarily securing a pretensioning state between the friction disk 21 and the adjustment eccentric 2*a* is performed as indicated by means of the shearing structure formed here by the pin 22. The torque transmission between the friction disk 21 and the operating eccentric 4*a* is performed in this embodiment by a catch peg 4*c* forming an integral component of the operating eccentric 4*a*, and is lifted from an end face sitting on the friction disk 21 and passed through a catch bore 21*a* formed in the friction disk 21. The catch peg 4*c* is inserted into a segmented recess 2*d*, which as such is formed in the base flange section 2*b*. This segmented recess 2*d* is shaped such that this sets the maximum permissible pivoting angle of the operating eccentric 4*a* relative to the adjustment eccentric. In this way, even for unintentional shearing of the pin 22 or else for disassembly of the tensioning device, overturning of the operating eccentric 4*a* relative to the adjustment eccentric 2*a* past the operational pivot angle range is prevented.

Figure 2A:
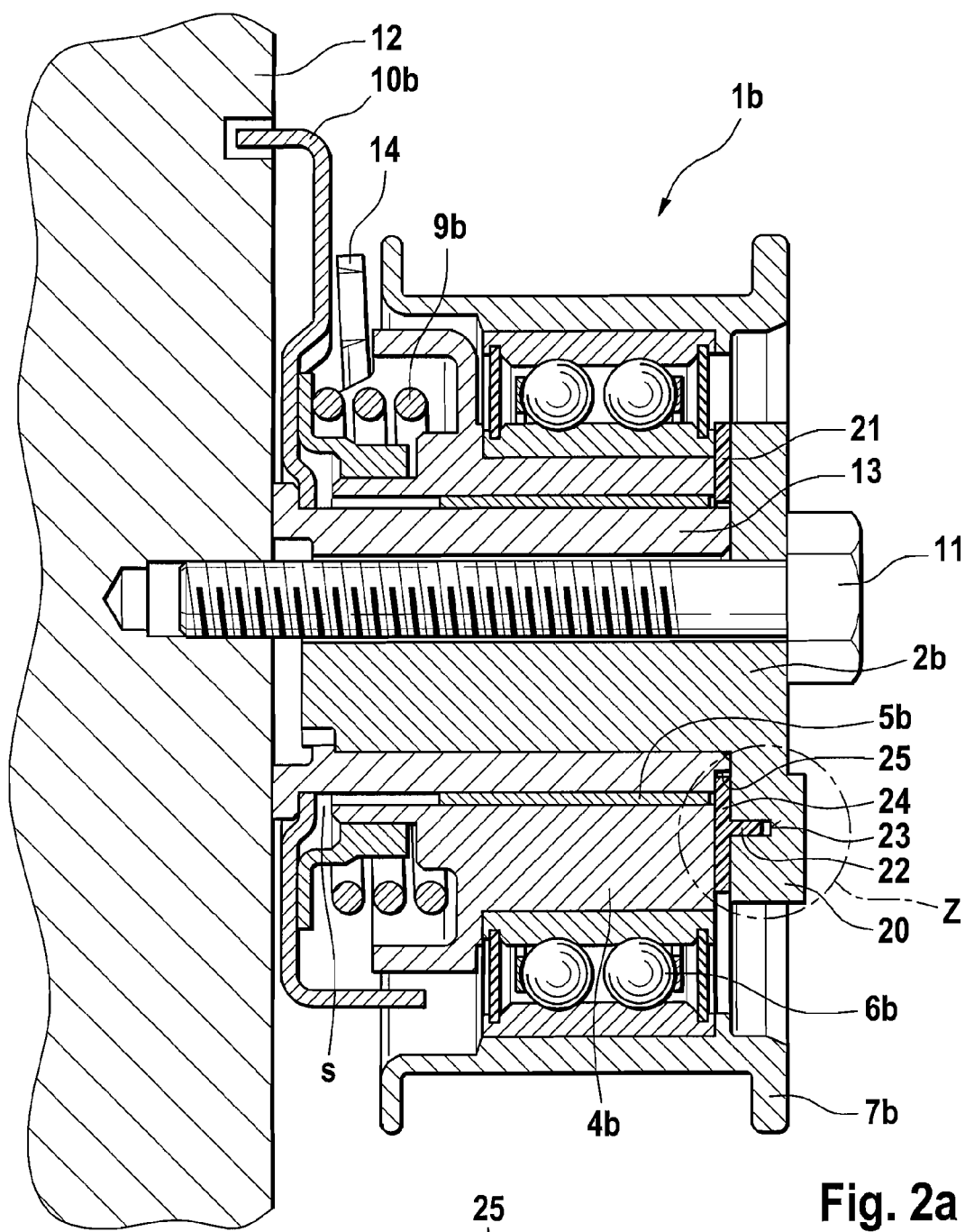
FIG. 2a an axial section view for illustrating the construction of a tensioning device constructed as a double eccentric tensioning device with a fixing device constructed as a shearing structure, through which the operating eccentric is temporarily secured in a pretensioned state relative to a base plate.

In FIG. 2*a*, another variant of a tensioning device 1*b* according to the invention is shown, in which the adjustment eccentric 2*b* is fixed to a housing 12 by means of an attachment screw 11. Deviating from the tensioning device according to FIG. 1*a*, the adjustment eccentric 2*b* is inserted into a hollow cylindrical carrier body 13, through which the tensioning device 1*b* is supported on the housing 12. The operating eccentric 4*b* is supported rotatably on the carrier body 13 by a slide bearing 5*b*.

On the outside, the operating eccentric 4*b* is surrounded by the rolling bearing 6*b*, which is connected to the running disk 7*b*. The torsion spring 9*b* is inserted between the base plate 10*b* and the operating eccentric 4*b*. A indexer 14 arranged locally on the operating eccentric 4*b* has the task of visually indicating the position of the operating eccentric 4*b* relative to the base plate 10*b*. The construction of the tensioning device 1*b* encloses an axial play "s" between an end face of the operating eccentric 4*b* and the base plate 10*b*.

Figure 2B:
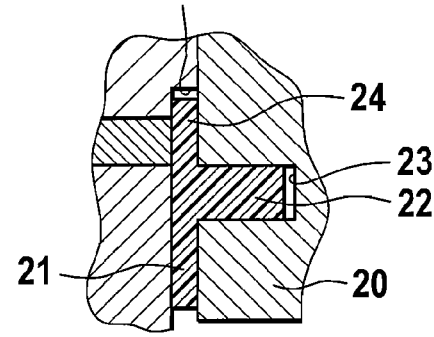
FIG. 2b the detail "Z" according to FIG. 2a at an enlarged scale.

FIG. 2*b* shows the detail "Z" according to FIG. 2*a* at an enlarged scale. For the initial fixing of the adjustment eccentric 2*b*, a friction disk 21, whose axially projecting pin 22 engages with a positive fit in a receptacle 23 shaped as a pocket bore, is inserted between an end of the operating eccentric 4*b* and a rim 20 of the adjustment eccentric 2*b*. Furthermore, the friction disk 21 on the inner periphery encloses a radially inwardly directed shear pin 24, which engages in an end groove 25 of the carrier body 13.

Figure 3:
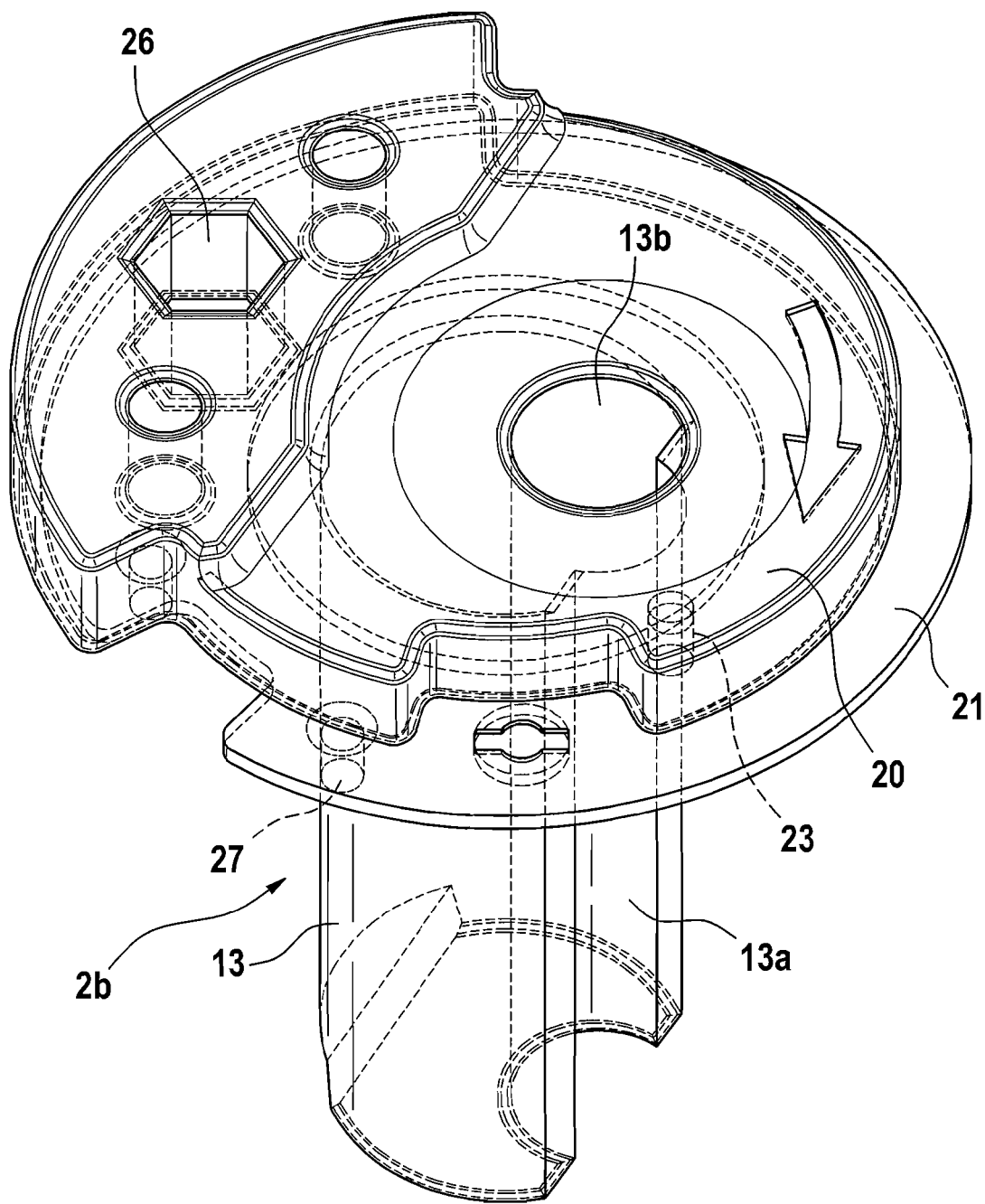
FIG. 3 a perspective view of an adjustment eccentric including a friction disk interacting with this eccentric and provided with a shearing structure.

FIG. 3 shows, in the form of a perspective view, how an adjustment eccentric 2*b* can be used, in particular, in the double eccentric tensioning device 1*b* according to FIG. 2*a*. This adjustment eccentric 2*b* comprises a carrier body 13, which forms an outer surface constructed as a cylinder shell section. The carrier body 13 further forms a groove section 13*a*, which extends in a passage bore 13*b*, in which the attachment screw 11 shown in FIG. 2*a* can be inserted. The adjustment eccentric 2*b* shown here is preferably made from a metal material. It is also possible to make this part with the adjustment eccentric 2*b* from a plastic material. The adjustment eccentric 2*b* comprises a rim 20, whose bottom side forms a seat surface on the friction disk 21. In the area of the rim 20 there is a catch structure 23 constructed here also as a pocket bore, in which a pin 22 constructed at first integrally with the friction disk 21 sits (see FIG. 2*a*).

As is visible in this view, a wrench section 26 is further constructed on the rim 20 of the adjustment eccentric 2*b*. A socket wrench constructed, for example, as a hexagon socket wrench or TORX wrench, can be inserted in this embodiment into this wrench section 26. By means of a socket wrench inserted into the wrench section 26, it is possible to pivot the adjustment eccentric 2*b* in a defined way.

The coupling of the friction disk 21 with the operating eccentric 4*b* (cf. FIG. 2*a*) can be realized, as provided in this embodiment, by catch pins 27, which are constructed integrally with the friction disk 21.

Figure 4:
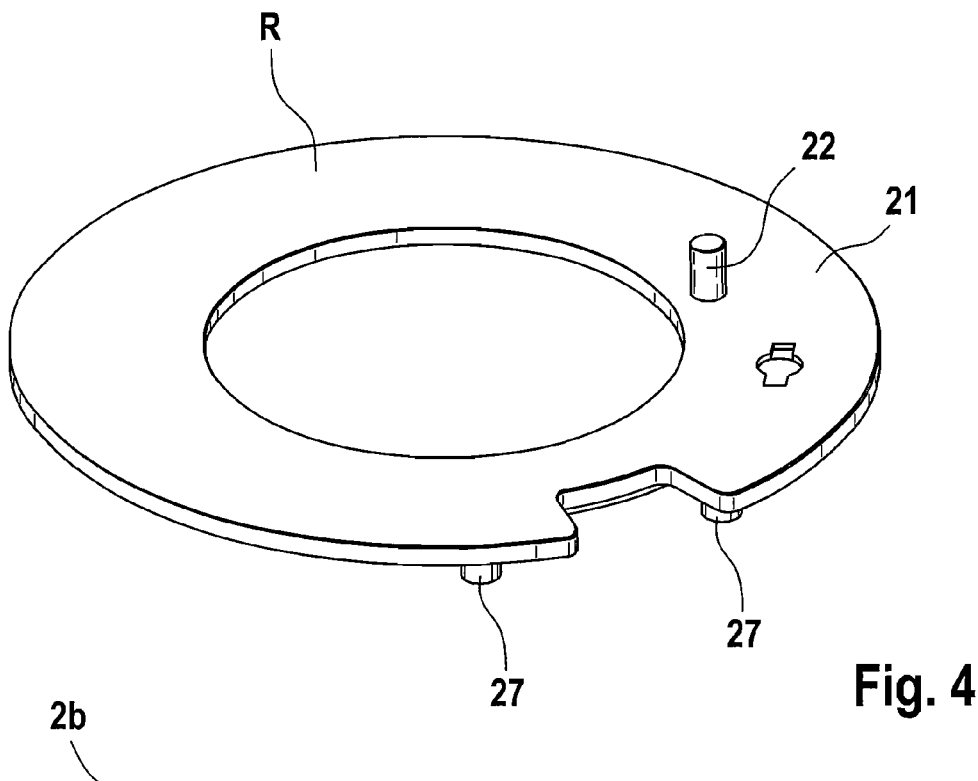
FIG. 4 a perspective view of a friction disk provided with shearing structures.

FIG. 4 shows the friction disk 21 in an alignment, in which the top friction surface R comes in contact with the bottom side of the rim 20 of the adjustment eccentric 2*b*. The pin 22 constructed as a shearing structure projects past this friction surface R. This pin 22 sits in a bore constructed complementary to this pin in the rim of the adjustment eccentric 2*b*. In the area of the bottom side of the friction disk 21, the catch pins 27 are constructed for rotationally locked anchoring of the friction disk 21 on the operating eccentric 4*b* (cf. FIG. 2*a*). These catch pins 27 are dimensioned in the embodiment shown here so that their transverse force transmission capacity is significantly greater than the transverse force transmission capacity of the pin 22 acting as a shearing structure.

Figure 5:
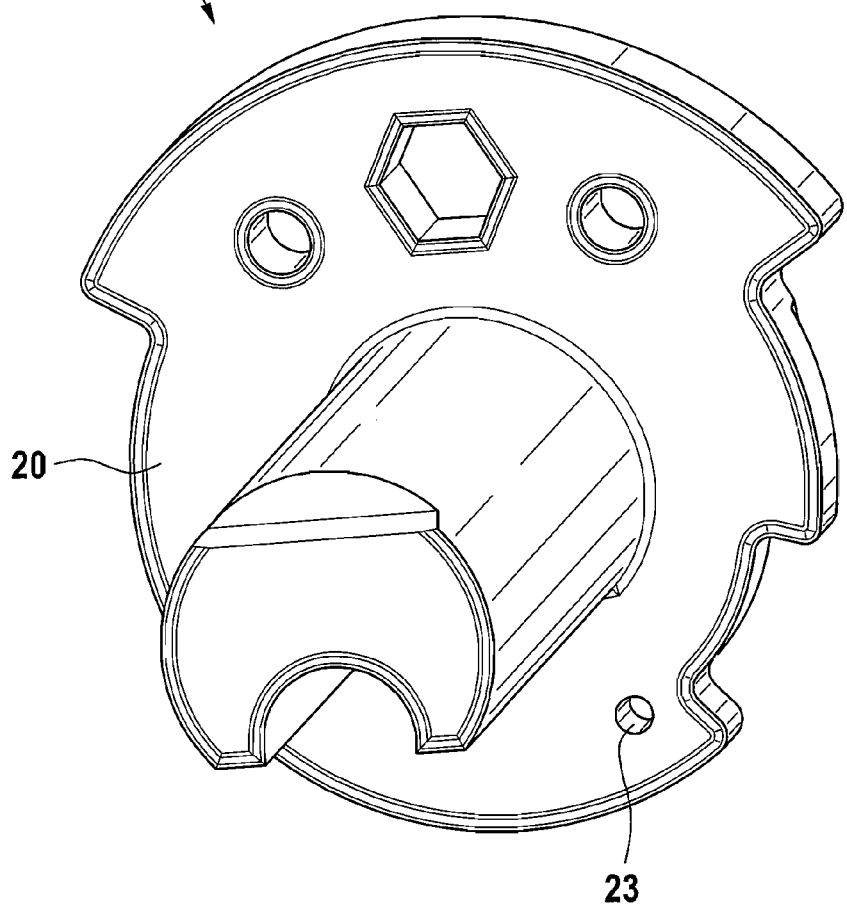
FIG. 5 a perspective view of the adjustment eccentric according to FIG. 3 with a view onto its lower head surface facing the friction disk.

In FIG. 5, in the form of a perspective view, a preferred construction of the adjustment eccentric 2*b* is shown. The bottom side of the rim 20 recognizable here sits on the friction disk 21 shown in FIG. 4. The pin of the friction disk 21 acting as a shearing structure 22 is inserted in the installed state into the pocket bore 23 recognizable here. After shearing of the pin 22, this part sheared from the friction disk 21 can remain in this pocket bore.

The rolling bearing of the tensioning device is preferably constructed as a radial rolling bearing, which is composed of an inner bearing ring and an outer bearing ring and also of a plurality of cylinder bodies rolling between the bearing rings in groove-shaped raceways and held relative to each other by a bearing cage at a constant distance and which has axially on both sides of its cylinder bodies a seal, with which the intermediate space between the bearing rings constructed as a grease storage area is sealed, wherein this rolling bearing is distinguished in that this is constructed as a ball roller bearing, whose cylinder bodies are constructed as ball rollers each with two parallel side surfaces flattened symmetrically from a basic ball shape. Relative to a comparable ball bearing, this ball roller bearing offers an increased bearing capacity due to the higher number of cylinder bodies that can be mounted and due to the reduced installation space of the cylinder bodies together with an increased grease storage area. The cylinder bodies of the radial rolling bearing constructed as ball rollers are preferably shaped so that these preferably have a width between their side surfaces of approximately 70% of the diameter of their basic ball shape and can be inserted at first axially "flat" into the radial rolling bearing through the distance between the concentric bearing rings having a height of approximately 80% of the diameter of the basic ball shape of the cylinder roller and can be pivoted through a corresponding rotation by approximately 90° in the raceways of the bearing rings. The outer bearing ring here can form the running disk directly. The inner bearing ring can be formed directly by the operating eccentric.

The present invention is not limited to the specified embodiments. In particular, it is possible to also combine the concept according to the invention for securing the operating eccentric 4b in a position tensioned under the effect of the torsion spring with any other securing concepts. In particular, it is possible to provide additional securing structures, which as such first permit a rotation causing a shearing of the shear pin 22 when a certain mounting state of the tensioning device is reached, in particular, the attachment screw 11 is already screwed deep enough into a structure surrounding the tensioning device.

The invention claimed is:

1. An eccentric tensioning device for a traction means drive, comprising:
   a track roller device, which comprises a running disk and a rolling bearing provided for supporting the disk,
   an operating eccentric for supporting the track roller device such that it can be displaced in a radial direction relative to a rotational axis of the rolling bearing according to a magnitude of pivoting of the operating eccentric,
   a torsion spring for pretensioning the operating eccentric in a pivoting direction, in which the operating eccentric forces the track roller device carried by the eccentric against an associated traction means,
   an adjustment eccentric for radial displacement of the operating eccentric,
   a fixing device for securing the operating eccentric in an initial position prior to installation of the tensioning device, in which the torsion spring is located in a pre-tensioned state between the operating eccentric and the adjustment eccentric to allow mounting of the eccentric tensioning device as a pre-tensioned unit,
   the fixing device is constructed as a shearing structure, and shearing off of the shearing structure is implemented through pivoting of the operating eccentric relative to the adjustment eccentric.

2. The eccentric tensioning device according to claim 1, wherein the shearing structure is constructed as a pin, which engages in a receptacle of the adjustment eccentric or the operating eccentric.

3. The eccentric tensioning device according to claim 1, wherein the eccentric tensioning device comprises a friction disk and that the shearing structure is constructed as a component of the friction disk.

4. The eccentric tensioning device according to claim 3, wherein the shearing structure is constructed as a pin, which projects axially past an end face of the friction disk.

5. The eccentric tensioning device according to claim 4, wherein a desired rupture point is prepared in a base area of the pin.

6. The eccentric tensioning device according to claim 5, wherein the pin constructed as a shear pin is allocated to a pocket bore, in which a sheared end of the shear pin remains and is secured captively after completion of an adjustment of the tensioner from the pre-tensioned state into a traction means-engaging state.

7. The eccentric tensioning device according to claim 6, wherein the shear pin has a step-like taper construction and is allocated to a similarly ring-stepped bore, in which the sheared end of the shear pin remains and is held captively after completion of the adjustment.

8. The eccentric tensioning device according to claim 1, wherein the torsion spring is constructed as a helical spring.

9. The eccentric tensioning device according to claim 1, wherein the adjustment eccentric is made from a plastic material.

10. An eccentric tensioning device for a traction means drive, comprising:
    a track roller device, which comprises a running disk and a rolling bearing provided for supporting the disk,
    an operating eccentric for supporting the track roller device such that it can be displaced in a radial direction relative to a rotational axis of the rolling bearing according to a magnitude of pivoting of the operating eccentric,
    a torsion spring for pretensioning the operating eccentric in a pivoting direction, in which the operating eccentric forces the track roller device carried by the eccentric against an associated traction means,
    an adjustment eccentric for radial displacement of the operating eccentric,
    a fixing device for securing the operating eccentric in an initial position prior to installation of the tensioning device, in which the torsion spring is located in a pre-tensioned state between the operating eccentric and the adjustment eccentric to allow mounting of the eccentric tensioning device as a pre-tensioned unit,
    the fixing device is constructed as a shearing structure comprising, a friction disk having an inner periphery with a radially inwardly directed shear pin, which engages in an end groove of a carrier body, on which the adjustment eccentric is supported rotatably by a slide bearing.

11. The eccentric tensioning device according to claim 10, wherein a dimensioning and arrangement of the shear pin is sufficient for securing against independent rotation and, the shear pin is sheared after overcoming an adjustment force in a unit in a work step of a work point adjustment of the tensioning device.

* * * * *